US 7,880,731 B2

(12) United States Patent
Wang et al.

(10) Patent No.: US 7,880,731 B2
(45) Date of Patent: Feb. 1, 2011

(54) TOUCHPAD COVER APPARATUS AND ELECTRONIC DEVICE USING THE SAME

(75) Inventors: Peng Wang, Shenzhen (CN); Wen-Haw Tseng, Taipei Hsien (TW); Shih-Fang Wong, Taipei-Hsien (TW)

(73) Assignees: Hong Fu Jin Precision Industry (ShenZhen) Co. Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 742 days.

(21) Appl. No.: 11/853,834

(22) Filed: Sep. 12, 2007

(65) Prior Publication Data

US 2008/0266268 A1    Oct. 30, 2008

(30) Foreign Application Priority Data

Apr. 24, 2007   (CN) .................. 2007 1 0200501

(51) Int. Cl.
*G06F 3/041* (2006.01)
(52) U.S. Cl. ................ 345/173; 361/679.1; 361/679.18
(58) Field of Classification Search ......... 345/173–178; 361/679.1, 679.18; 220/811–813; 455/575.4
See application file for complete search history.

(56) References Cited

U.S. PATENT DOCUMENTS

| | | | | |
|---|---|---|---|---|
| 5,067,573 | A * | 11/1991 | Uchida ..................... | 345/173 |
| 5,400,914 | A * | 3/1995 | Lin .......................... | 220/345.4 |
| 5,793,355 | A * | 8/1998 | Youens ..................... | 345/157 |
| 5,818,924 | A * | 10/1998 | King et al. .............. | 379/433.13 |
| 5,950,816 | A * | 9/1999 | Reid ......................... | 206/38.1 |
| 5,953,199 | A * | 9/1999 | Owens ...................... | 361/212 |
| 5,990,874 | A * | 11/1999 | Tsumura et al. ......... | 345/173 |
| 6,065,990 | A * | 5/2000 | McHugh et al. .......... | 439/342 |
| 6,083,028 | A * | 7/2000 | Pei et al. .................. | 439/342 |
| 6,332,084 | B1 * | 12/2001 | Shaanan et al. .......... | 455/566 |
| 6,388,660 | B1 | 5/2002 | Manser et al. | |
| 6,477,274 | B1 * | 11/2002 | Kim et al. ................ | 382/187 |
| 6,614,423 | B1 * | 9/2003 | Wong et al. .............. | 345/173 |
| 6,756,971 | B1 * | 6/2004 | Ramey et al. ............ | 345/173 |
| 7,006,077 | B1 * | 2/2006 | Uusimaki ................. | 345/173 |
| 7,119,291 | B2 * | 10/2006 | Sun ........................... | 200/5 A |
| 7,464,814 | B2 * | 12/2008 | Carnevali ................. | 206/320 |
| 7,599,721 | B2 * | 10/2009 | Taki et al. ................ | 455/575.1 |
| 7,798,355 | B2 * | 9/2010 | Geisen et al. ............ | 220/254.9 |
| 2003/0119544 | A1 * | 6/2003 | Gventer .................... | 455/550 |

(Continued)

*Primary Examiner*—Amare Mengistu
*Assistant Examiner*—Gene W Lee
(74) *Attorney, Agent, or Firm*—Frank R. Niranjan (57) ABSTRACT

An electronic device includes a base, a touchpad and a touchpad cover apparatus for covering an operating surface of the touchpad. The touchpad is fastened to a bottom plate of the base. An opening is defined in the shell for revealing the operating surface of the touchpad. The touchpad cover apparatus includes a rail guide extending from a bottom surface of the shell and a touchpad cover. A pair of parallel guiding channels is defined in the rail guide. The touchpad cover is slidably inserted between the pair of parallel guiding channels, being slidable between a first position such that the operating surface of the touchpad is revealed through the opening of the shell, and a second position such that an operating surface of the touchpad is covered by the touchpad cover.

15 Claims, 7 Drawing Sheets

U.S. PATENT DOCUMENTS

| | | | |
|---|---|---|---|
| 2003/0132917 A1* | 7/2003 | Yuen | 345/173 |
| 2004/0136149 A1* | 7/2004 | Wang et al. | 361/680 |
| 2005/0057525 A1* | 3/2005 | Sun | 345/173 |
| 2005/0092763 A1* | 5/2005 | Haggerty et al. | 220/912 |
| 2005/0277449 A1* | 12/2005 | Wu | 455/575.1 |
| 2005/0277453 A1* | 12/2005 | Kim | 455/575.8 |
| 2005/0288077 A1* | 12/2005 | Wu | 455/575.4 |
| 2006/0019729 A1* | 1/2006 | Harris | 455/575.6 |
| 2008/0230283 A1* | 9/2008 | Yoon et al. | 178/18.11 |
| 2008/0316687 A1* | 12/2008 | Richardson et al. | 361/680 |
| 2009/0009945 A1* | 1/2009 | Johnson et al. | 361/681 |

* cited by examiner

TOUCHPAD COVER APPARATUS AND ELECTRONIC DEVICE USING THE SAME

BACKGROUND OF THE INVENTION

1. Field of the Invention

The present invention relates to a touchpad cover apparatus of a touchpad and an electronic device using the same.

2. Description of Related Art

A touchpad is typically mounted on some electronic devices, such as a portable computer. A touch-sensitive surface of the touchpad is touched in order to control a position of a cursor on a display screen of the portable computer or to perform a select operation. Generally, the portable computer includes a base and a cover pivotally attached to the base. The base includes a shell and a bottom plate. The bottom plate is mounted on a bottom surface of the shell by screws. The touchpad is fastened to the bottom plate of the portable computer. The touchpad is generally revealed through an opening of the shell, thus the touch-sensitive surface of the touchpad is easily contaminated by, for example, dust or food particles. Furthermore, the touchpad is difficult to clean and thus affects the lifetime of the touchpad.

What is desired, therefore, is a touchpad cover apparatus for a touchpad which can prevent the touch-sensitive surface of the touchpad from being contaminated.

SUMMARY OF THE INVENTION

A touchpad cover apparatus for a touchpad, an electronic device with the touchpad and the touchpad cover apparatus are provided. The touchpad cover apparatus covers a touch-sensitive surface of the touchpad, thus prevent the touch-sensitive surface from being contaminated, and prolong a long-term life of the touchpad assembled in the electronic device.

The electronic device includes a base, a touchpad and a touchpad cover apparatus for covering an operating surface of the touchpad. The touchpad is fastened to a bottom plate of the base. An opening is defined in the shell for revealing the operating surface of the touchpad. The touchpad cover apparatus includes a rail guide extending from a bottom surface of the shell and a touchpad cover. A pair of parallel guiding channels is defined in the rail guide. The touchpad cover is slidably inserted between the pair of parallel guiding channels, and is slidable between a first position, such that the operating surface of the touchpad is revealed through the opening of the shell, and a second position such that an operating surface of the touchpad is covered by the touchpad cover.

Other advantages and novel features will become more apparent from the following detailed description when taken in conjunction with the accompanying drawing, in which:

DETAILED DESCRIPTION OF THE INVENTION

The present features and functions involving a touchpad cover apparatus can be incorporated in an electronic device with a touchpad such as a notebook computer. The following detailed descriptions of exemplary and preferred embodiments are made with reference to the attached drawings.

Figure 1:
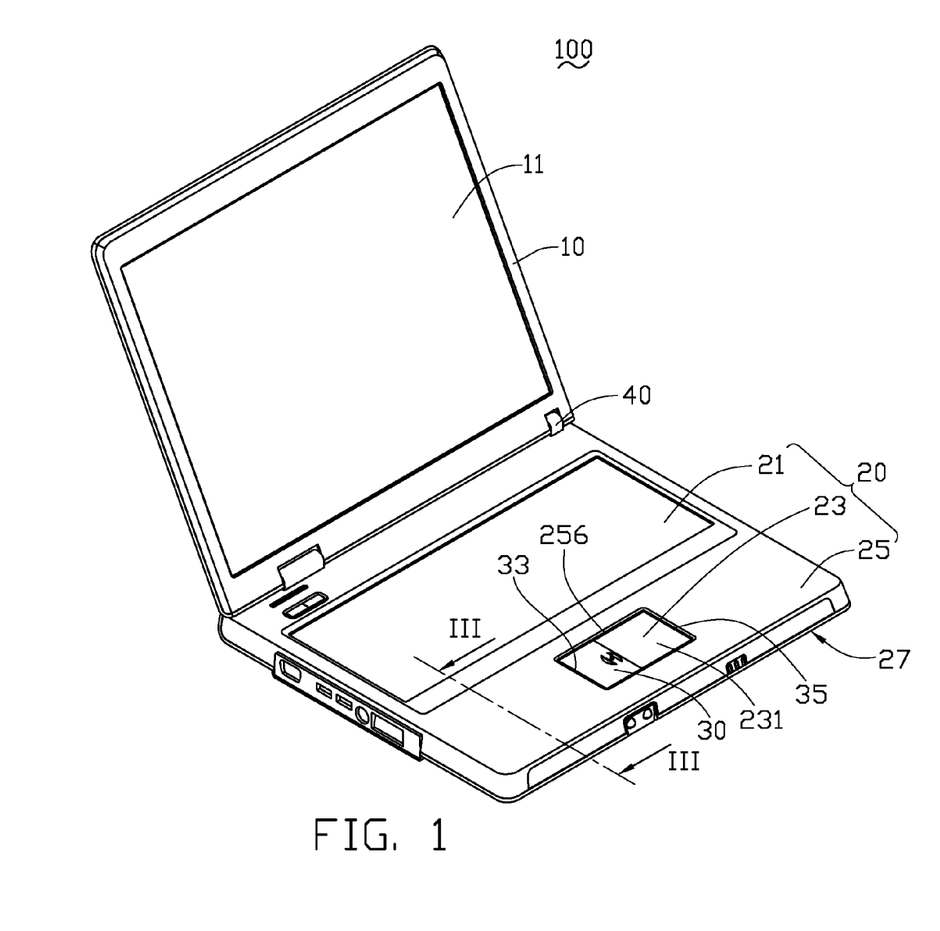
FIG. 1 is a schematic isometric view of a notebook computer with a touchpad and a touchpad cover apparatus in accordance with a preferred embodiment of the present invention.

FIG. 1 is a schematic isometric view of a notebook computer with a touchpad and a touchpad cover apparatus in accordance with a preferred embodiment. In the preferred embodiment, the notebook computer 100 includes a cover 10, a base 20, and a touchpad cover apparatus 30. The cover 10 is pivotally attached to the base 20 using a fastening member 40 such as hinge, to allow the cover 10 to be rotatable relative to the base 20. A display screen 111 is assembled in the cover 10. A keyboard 21 is mounted in a top surface of the base 20. The keyboard 21 is adjacent to a side of the base 20 where the hinge 40 is mounted. The base 20 includes a shell 25 and a bottom plate 27. An opening 256 is defined in the shell 25 on another side of the base 20 opposite to the hinge 40. A touchpad 23 is fastened to the bottom plate 27, and revealed through the opening 256 of the shell 25. A touchpad cover apparatus 30 is further provided for protecting an operating surface 231 of the touchpad 23 when the touchpad is not in use.

Figure 2:
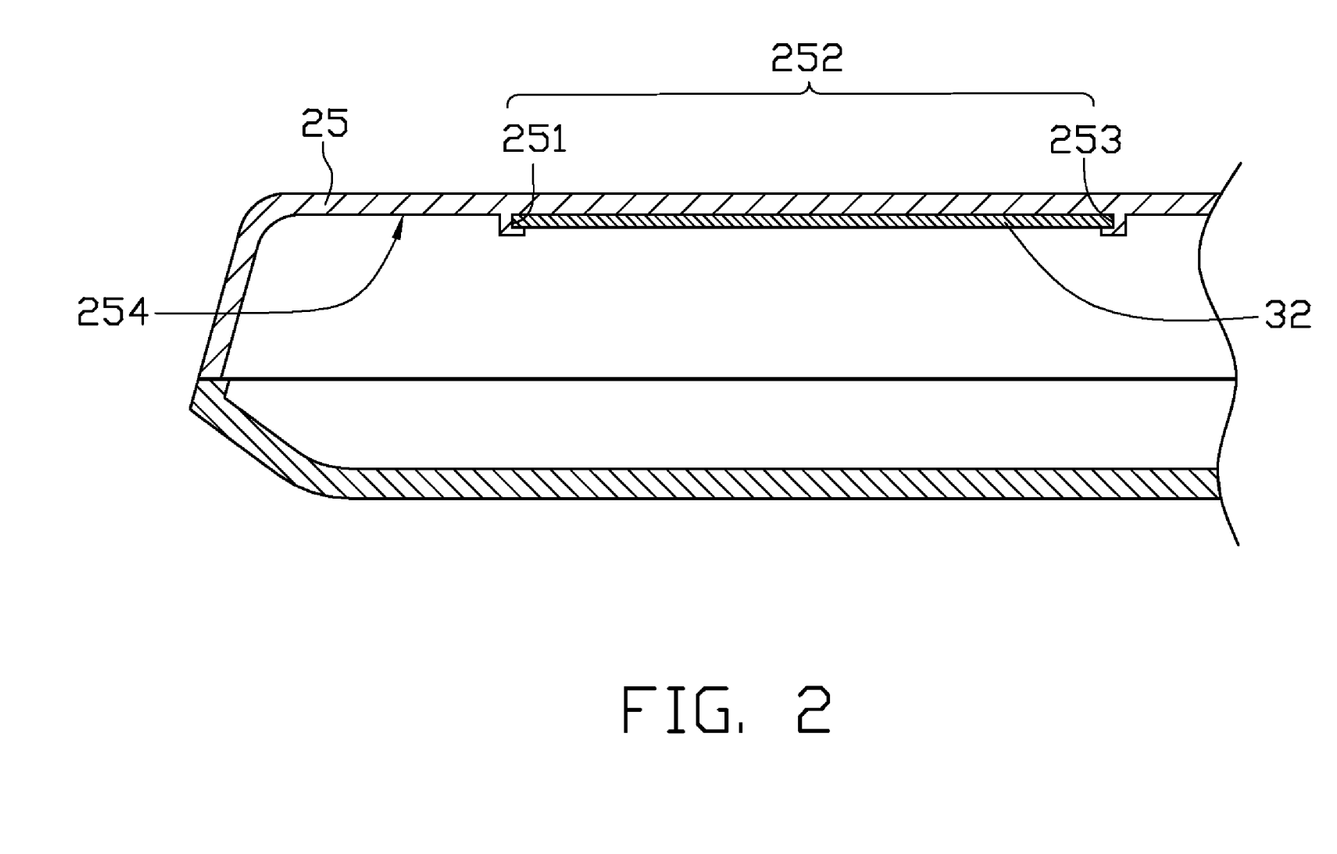
FIG. 2 is a schematic isometric view of a touchpad cover of the touchpad cover apparatus in FIG. 1.
Figure 3:
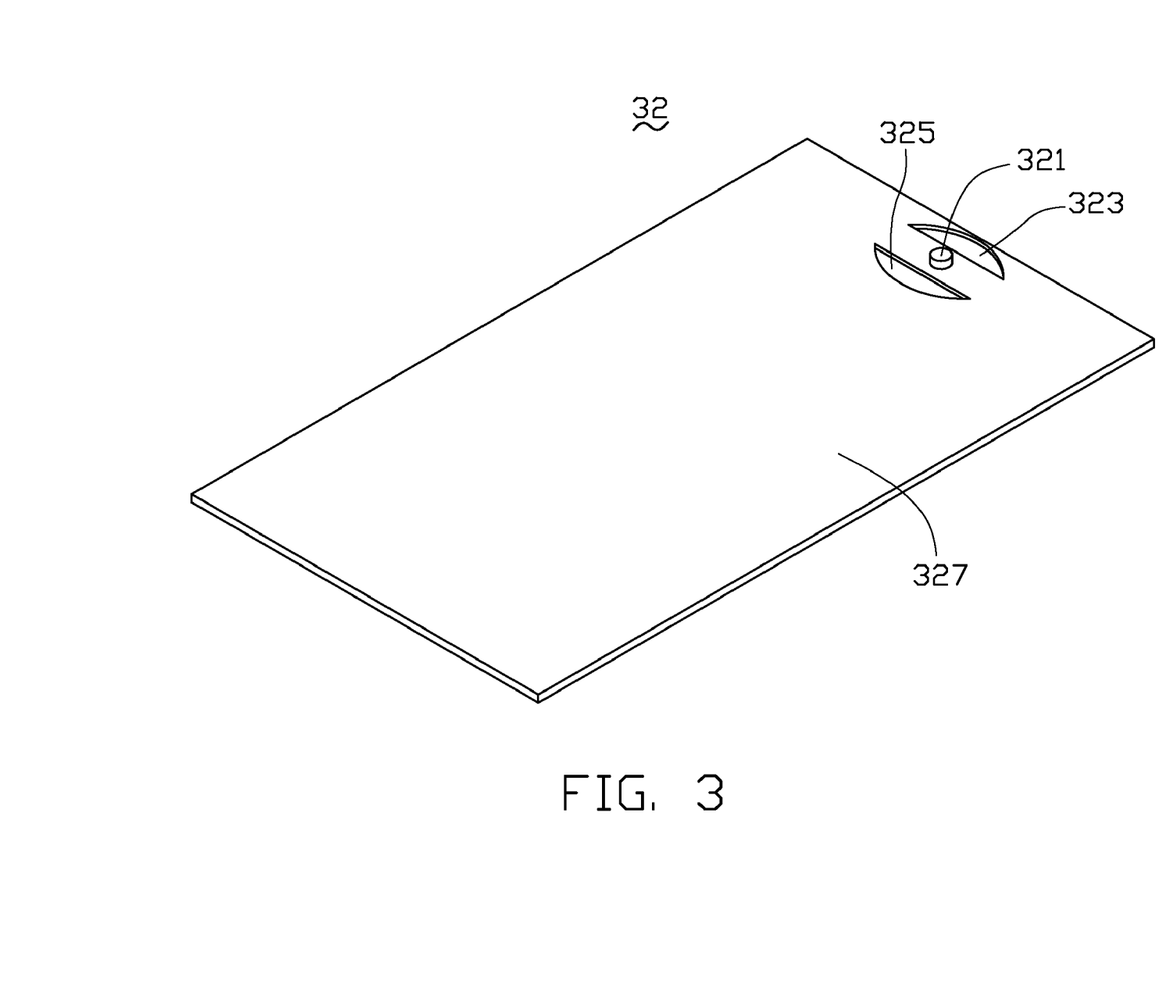
FIG. 3 is a partial cross-section profile of the embodiment of FIG. 1 taken along line III-III.

Referring to FIG. 2 and FIG. 3, the touchpad cover apparatus 30 includes a rail guide 252 extending from a bottom surface 254 of the shell 25 and a touchpad cover 32. A pair of parallel guiding channels 251, 253 are defined in the rail guide 252 correspondingly. A width of the touchpad cover 32 is substantially equal to a width between the pair of the parallel guiding channels 251, 253, and a length of the pair of parallel guiding channels 251, 253 is slightly smaller than two times of the length of the touchpad cover 32. The touchpad cover 32 is slidably inserted between the pair of parallel guiding channels 251, 253 of the rail guide 252. The touchpad cover 32 is slidable between a first position beneath the shell 25 such that the operating surface 231 of the touchpad 23 is revealed, and a second position beneath the shell 25 such that the operating surface 231 of the touchpad 23 is covered by the touchpad cover 32. Length and width of the touchpad cover 32 are correspondingly slightly larger than the length and width of the opening 256 of the shell 25, thus, the touchpad cover 32 can fully cover the operating surface 231 of the touchpad 23 when the touchpad cover 32 is moved to the second position.

A tab 321 extends from a top surface 327 of the touchpad cover 32. The tab 321 is configured for the edge 35 in the opening 256 of the shell 25 to catch and stop the touchpad cover 32 when the touchpad cover 32 slides to the second position, thus preventing the touchpad cover 32 from sliding beyond the second position. The tab 321 is adjacent to an edge (not labeled) of the touchpad cover 32 that is perpendicular to the rail guide 252. Two slots 323, 325 are defined in a top surface 327 of the touchpad cover 32, and are configured for a hold to move the touchpad cover 32. The two slots 323, 325 are at opposite sides of the tab 321.

Figure 4:
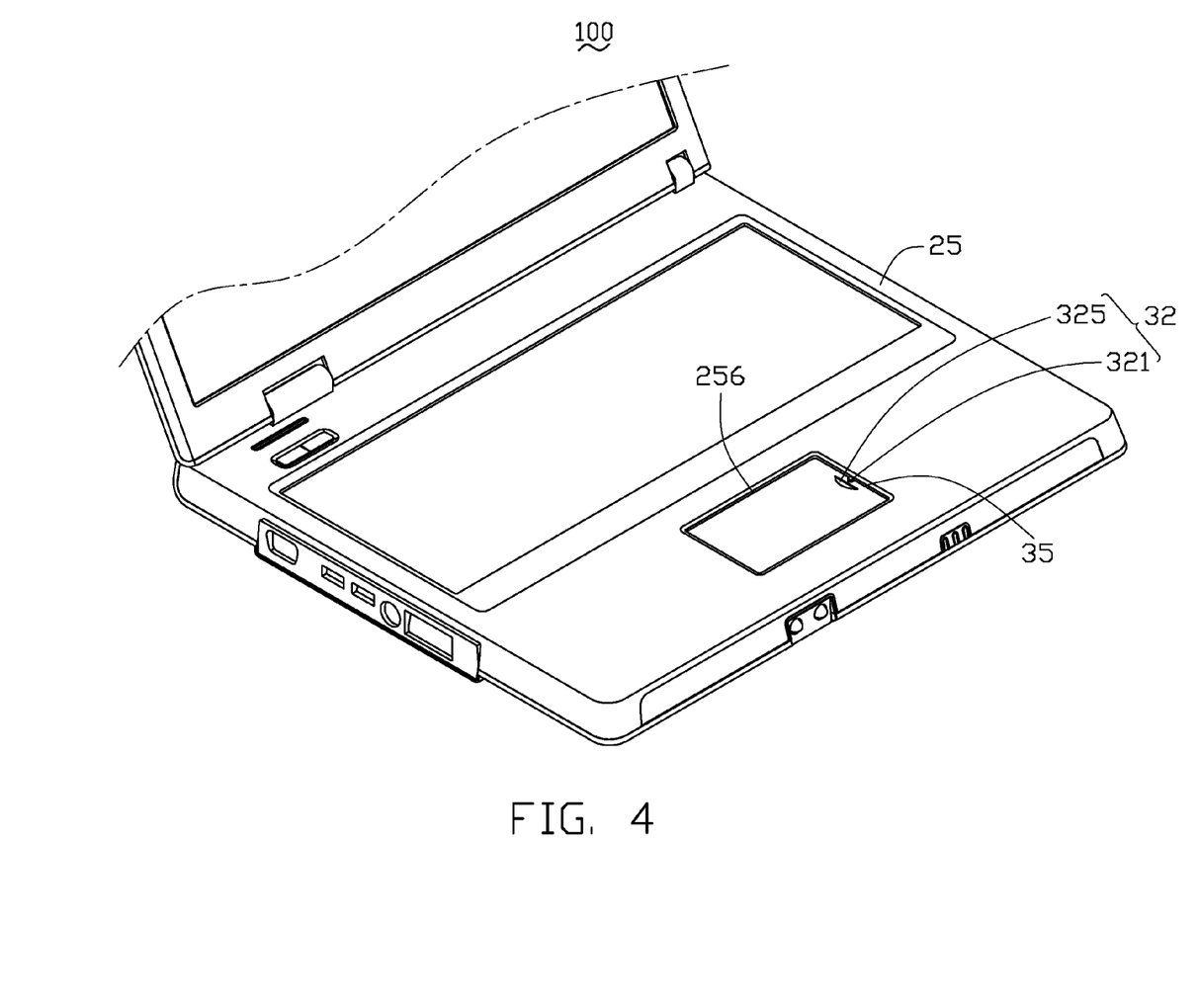
FIG. 4 is a schematic view when the touchpad cover is at a second position covering the touchpad in FIG. 1.
Figure 5:
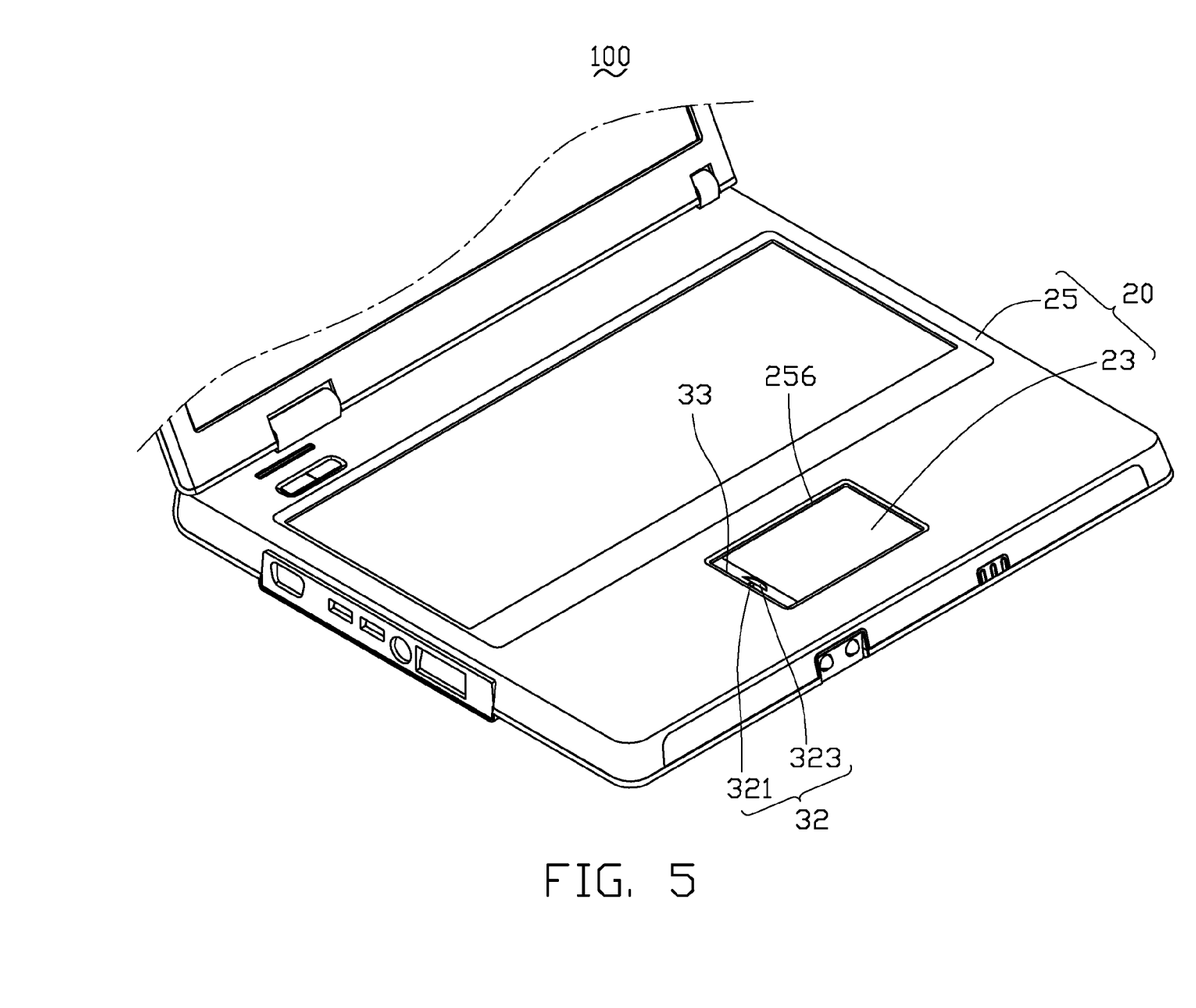
FIG. 5 is a schematic view when the touchpad cover is at a first position beneath the shell.

FIG. 4 shows a schematic view when the touchpad cover 32 is at the second position covering the touchpad 23 in FIG. 1. Referring to FIG. 1, the tab 321 abuts the edge 35 of the opening 256 of the shell 25, and the slot 323 is beneath the shell 25. Referring to FIG. 5, another schematic view is shown when the touchpad cover 32 is at the first position beneath the shell 25. In this view, the tab 321 abuts an edge 33 of the opening 256 of the shell 25, and the slot 325 is beneath the shell 25. Thus, the touchpad 23 is revealed through the opening 256 of the shell 25.

Figure 6:
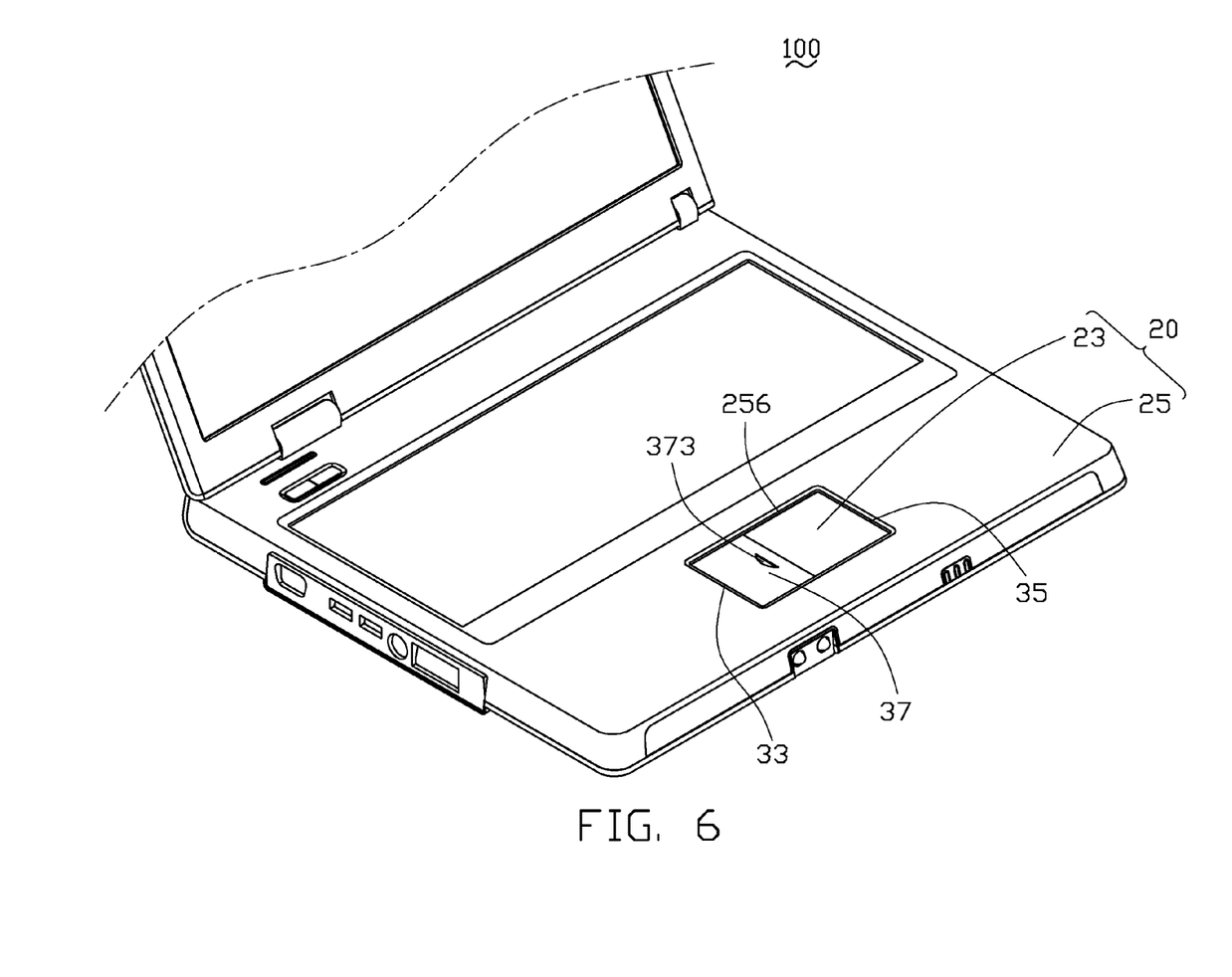
FIG. 6 is a schematic isometric view of a notebook computer with a touchpad and a touchpad cover apparatus in accordance with an alternative embodiment of the present invention.

FIG. 6 is a schematic isometric view of a notebook computer with a touchpad 23 and a touchpad cover apparatus 30 of the touchpad 23 in accordance with an alternative embodiment. Also referring to FIG. 7, the touchpad cover apparatus 37 includes a touchpad cover 38 and a rail guide 258 having a parallel of guiding channels 257, 259. A slot 373 is defined in a top surface of the touchpad cover 38, and is configured for a hold to move the touchpad cover 38. The slot 373 abuts the edge 35 of the opening 256 of the shell 25. A width of the touchpad cover 38 is substantially equal to a width between the pair of the parallel guiding channels 257, 259, and a length of the pair of parallel guiding channels 257, 259 is slightly smaller than two times than that of the touchpad cover 38. The touchpad cover 38 is slidably inserted between the pair of parallel guiding channels 257, 259 of the rail guide 258. The touchpad cover 38 is slidable between the first position beneath the shell 25 such that an operating surface 231 of the touchpad 23 is revealed, and the second position beneath the shell 25 such that the operating surface 231 of the touchpad 23 is covered by the touchpad cover 38. A length and a width of the touchpad cover 38 are correspondingly slightly larger than that of the opening 256 of the shell 25, thus, the touchpad cover 38 can fully cover the operating surface 231 of the touchpad 23 when the touchpad cover 38 is moved to the second position at the edge 35 of the opening 256 of the shell 25.

Figure 7:
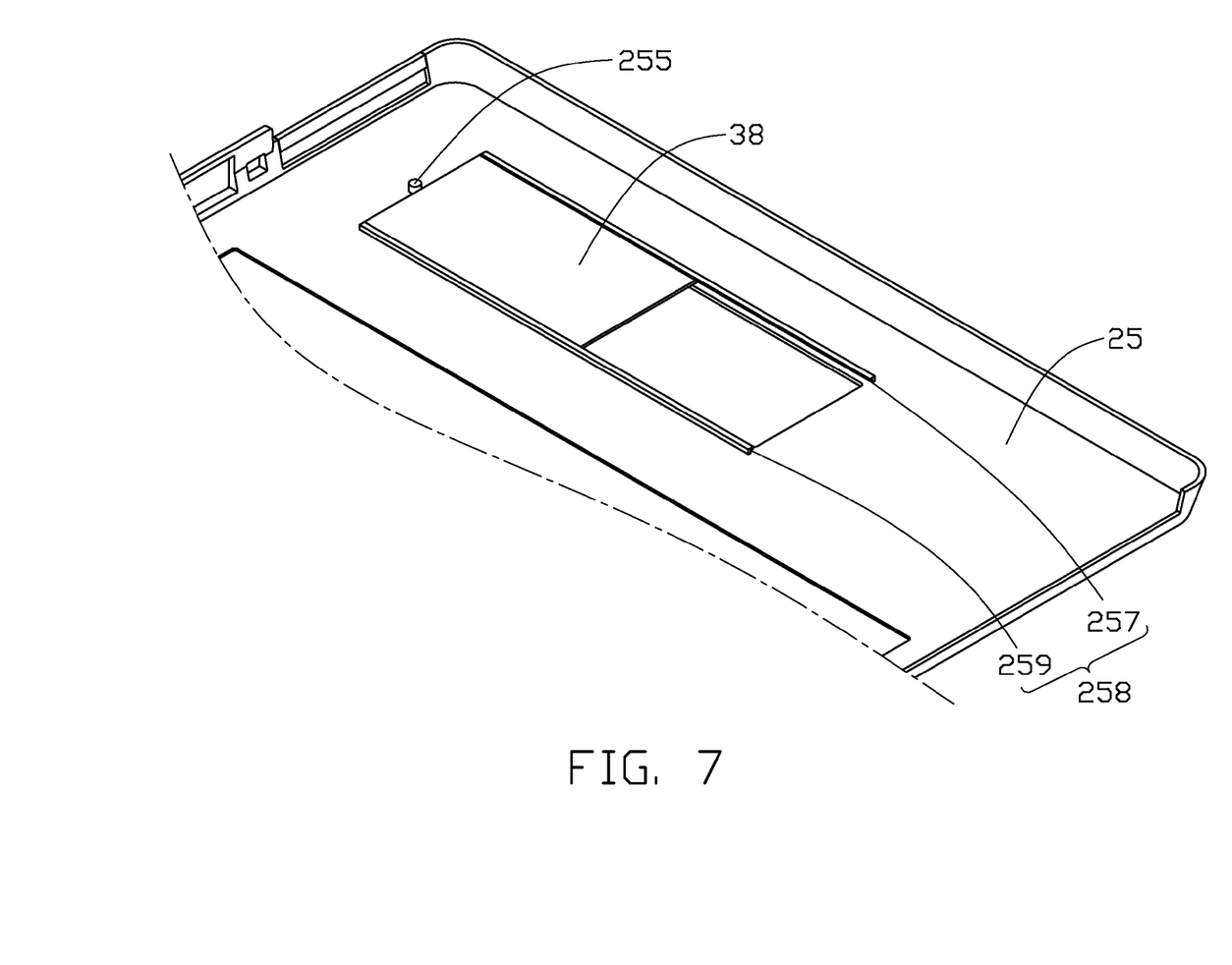
FIG. 7 is a schematic bottom surface view of the touchpad cover apparatus in FIG. 6.

A tab 255 extends from a bottom surface 254 of the shell 25, and is configured for stopping the touchpad cover 38 when the touchpad cover 38 slides to the second position in a first direction. Thus, the touchpad cover 38 can be prevented from over slide in the first direction. A distance between the tab 255 and the edge 33 of the opening 256 of the shell 25 is slightly smaller than a length of the touchpad cover 38.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A touchpad cover apparatus covering an operating surface of a touchpad assembled in an electronic device, the electronic device comprising a shell, an opening being defined in the shell, the touchpad cover apparatus comprising:
    a rail guide extending from a bottom surface of the shell, and a pair of parallel guiding channels being defined in the rail guide;
    a touchpad cover being slidably inserted between the pair of parallel guiding channels of the rail guide, the touchpad cover being slidable between a first position, such that the operating surface of the touchpad is revealed through the opening of the shell, and a second position such that the operating surface of the touchpad is covered by the touchpad cover;
    wherein the touchpad cover defines a tab for catching and stopping the touchpad cover when the touchpad cover slides to the first position or the second position, and at least one slot for a hold to move the touchpad cover, the tab and the at least one slot are defined at the same surface of the touchpad cover.

2. The touchpad cover apparatus as claimed in claim 1, wherein the tab extends from a top surface of the touchpad cover, and the least one slot is defined in the top surface.

3. The touchpad cover apparatus as claimed in claim 1, wherein a width of the touchpad cover is substantially equal to a width between the pair of the parallel guiding channels.

4. The touchpad cover apparatus as claimed in claim 1, wherein a length and a width of the touchpad cover are correspondingly larger than that of the opening of the shell.

5. An electronic device comprising:
    a base comprising a shell and a bottom plate, an opening being defined in the shell;
    a touchpad fastened to the bottom plate, an operating surface of the touchpad being revealed through the opening of the shell; and
    a touchpad cover apparatus for covering the operating surface of the touchpad, wherein the touchpad cover apparatus comprises:
    a rail guide extending from a bottom surface of the shell, a pair of parallel guiding channels being defined in the rail guide; and
    a touchpad cover being slidably inserted between the pair of parallel guiding channels of the rail guide, the touchpad cover being slidable between a first position, such that the operating surface of the touchpad is revealed through the opening of the shell, and a second position such that the operating surface of the touchpad is covered by the touchpad cover, the touchpad defining two slots configured for holds to move the touchpad cover;
    wherein when the touchpad cover is in the first position, one of the two slots is beneath the shell, and when the touchpad cover is in the second position, the other one of the two slots is beneath the shell.

6. The electronic device as claimed in claim 5, wherein a tab extends from a top surface of the touchpad cover, and is configured for an edge of the opening of the shell to catch and stop the touchpad cover when the touchpad cover slides to the first position and the second position.

7. The electronic device as claimed in claim 6, wherein the two slots are defined in a top surface of the touchpad cover, and the tab is located between the two slots.

8. The electronic device as claimed in claim 5, wherein a tab extends from the bottom surface of the shell, and is configured for stopping the touchpad cover when the touchpad cover slides to the second position.

9. The electronic device as claimed in claim 8, wherein at least one slot is defined in a top surface of the touchpad cover, and is configured for a hold to move the touchpad cover.

10. The electronic device as claimed in claim 5, wherein a width of the touchpad cover is substantially equal to a width between the pair of the parallel guiding channels.

11. The electronic device as claimed in claim 5, wherein a length and a width of the touchpad cover are correspondingly larger than that of the opening of the shell.

12. The touchpad cover apparatus as claimed in claim 2, wherein the at least one slot is two slots, and the tab is located between the two slots.

13. The touchpad cover apparatus as claimed in claim 12, wherein when the touchpad cover is in the first position, one of the two slots is beneath the shell, and when the touchpad cover is in the second position, the other one of the two slots is beneath the shell.

14. An electronic device, comprising:

a touchpad with an operating surface;

a shell defining an opening for the operating surface exposing outside; and a touchpad cover being capable of sliding with respected to the shell to selectively locate between a first position and a second position; the touchpad cover defining two slots on a top surface thereof, and the two slots adapted to be used as holds to move the touchpad cover;

wherein when the touchpad cover is in the first position, the operating surface is revealed from the opening, and one of the two slots is beneath the shell; when the touch pad cover is in the second position, the operating surface is covered by the touchpad cover, and the other one of the two slots is beneath the shell.

15. The electronic device according to claim 14, wherein the touchpad cover further comprises a tab extending from the top surface, and the tab is located between the two slots, the tab is adapted to catch and stop the touchpad cover when the touchpad cover slides to the first position or the second position.

* * * * *